Nov. 2, 1965 E. ZIMMERMANN 3,215,517
METHOD FOR FLAME CUTTING AND SEALING PLANAR ENDS OF
A GLASS CONTAINER
Filed Sept. 14, 1960 5 Sheets-Sheet 1
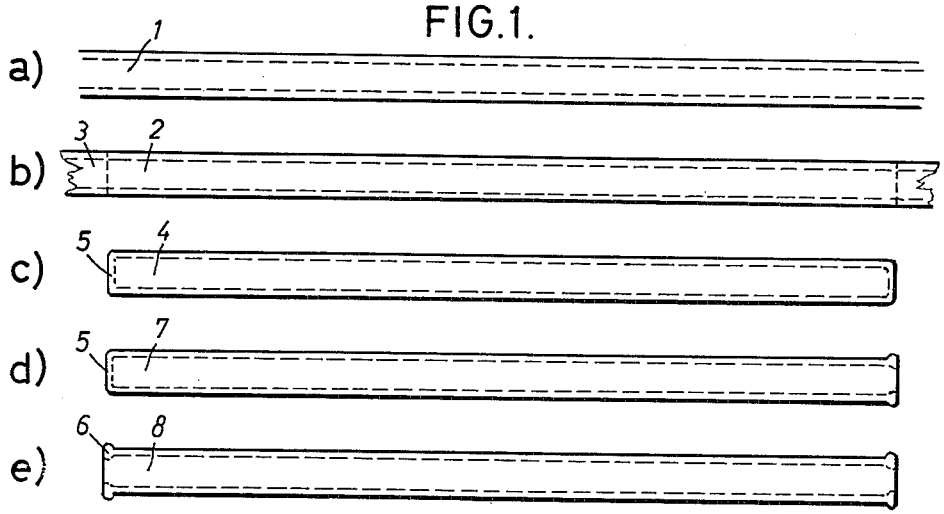
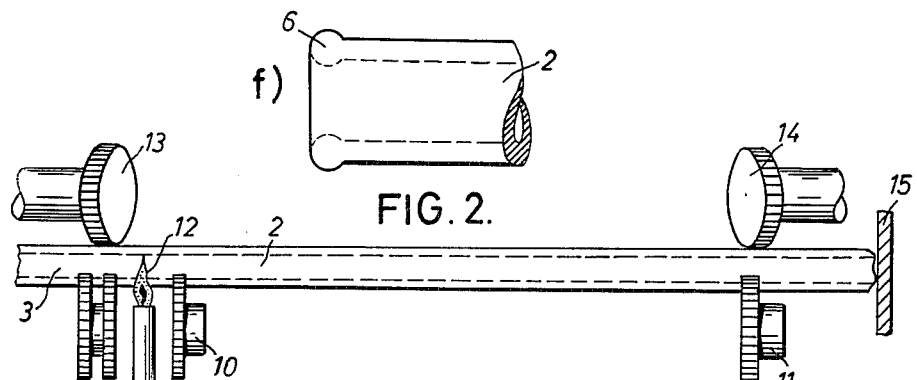
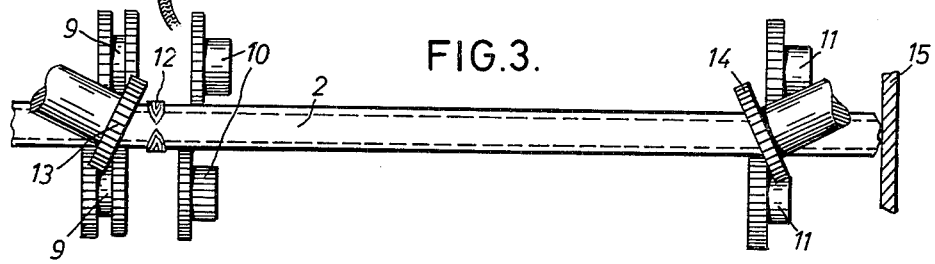
INVENTOR:
EHRENFRIED ZIMMERMANN
By *Otto John Munz*
Attorney

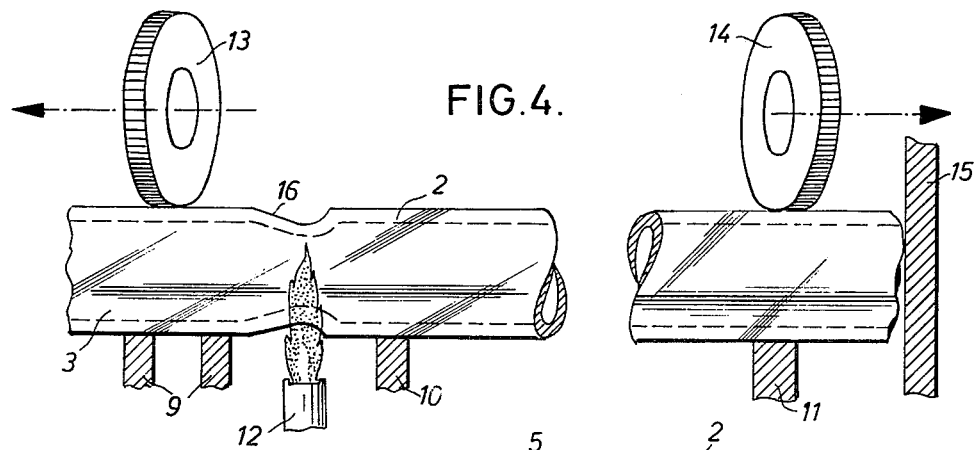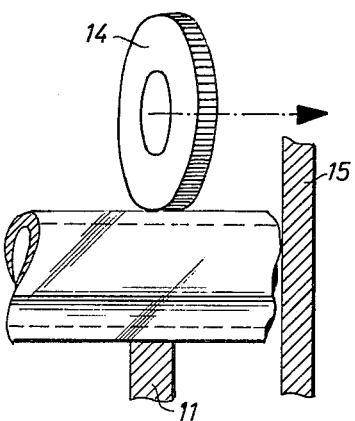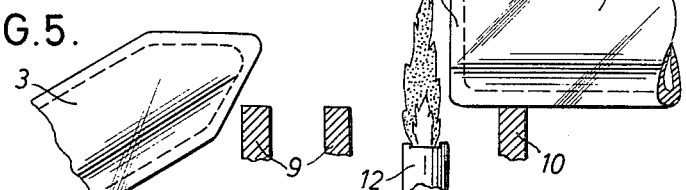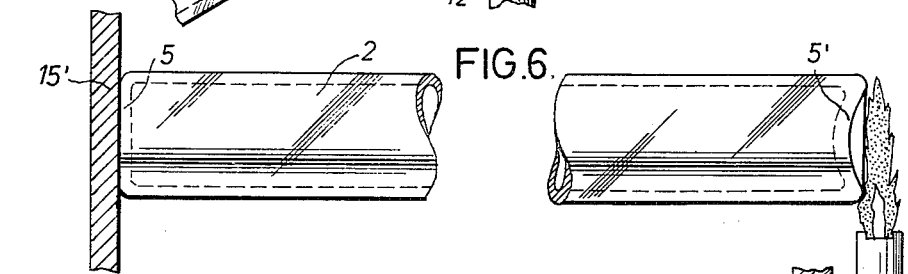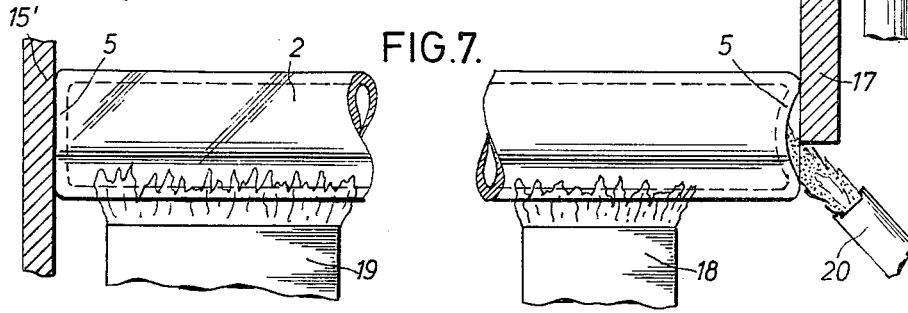

Nov. 2, 1965 E. ZIMMERMANN 3,215,517
METHOD FOR FLAME CUTTING AND SEALING PLANAR ENDS OF
A GLASS CONTAINER
Filed Sept. 14, 1960 5 Sheets-Sheet 3

INVENTOR:
EHRENFRIED ZIMMERMANN

By *Otto John Munz*

Attorney

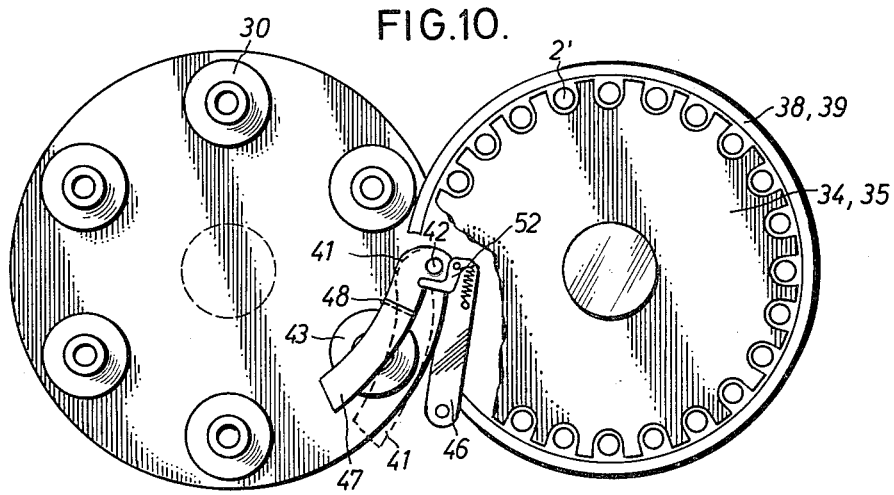
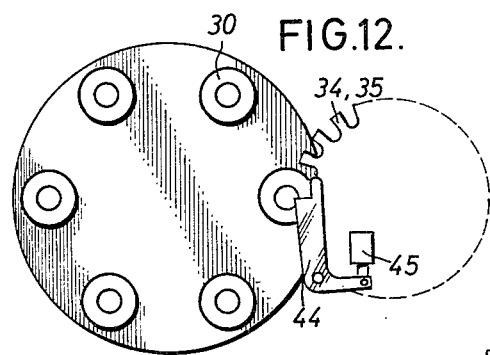
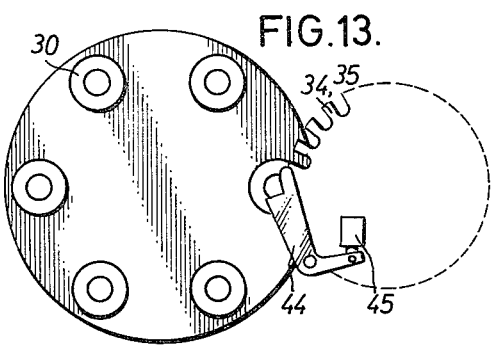
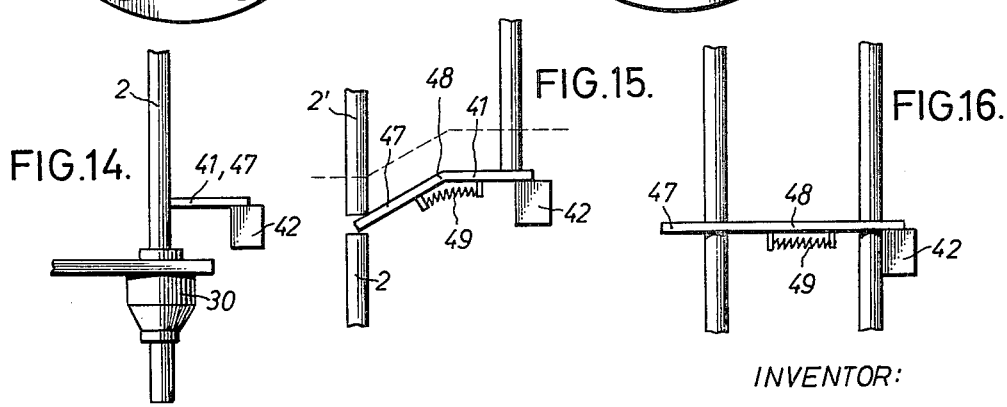

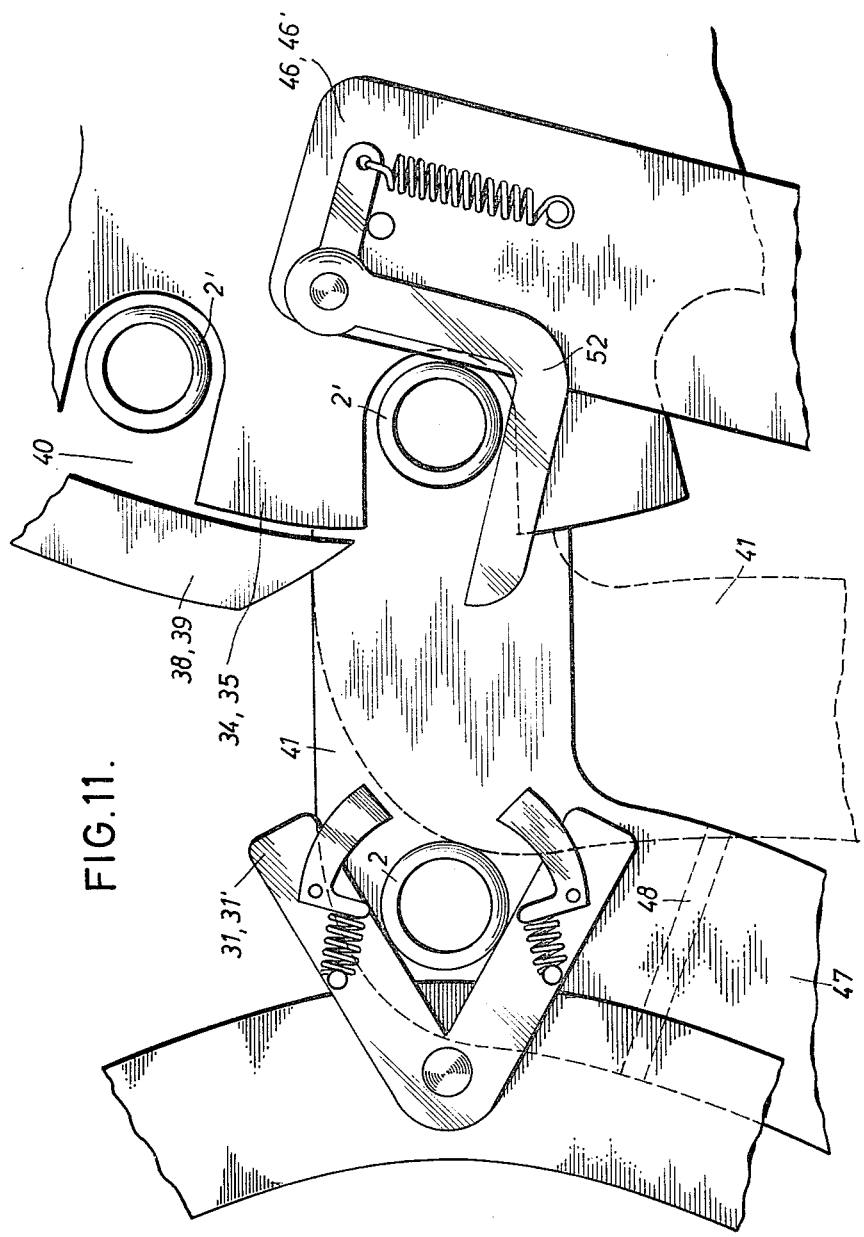

ns, these fall into the range between 150° C. and 200° C.

United States Patent Office 3,215,517
Patented Nov. 2, 1965

3,215,517
METHOD FOR FLAME CUTTING AND SEALING PLANAR ENDS OF A GLASS CONTAINER
Ehrenfried Zimmermann, Klosters, Graubuenden, Switzerland, assignor to Rota Patent A.G., Chur, Switzerland, a company of Switzerland
Filed Sept. 14, 1960, Ser. No. 55,926
Claims priority, application Germany, Sept. 14, 1959, R. 26,363
2 Claims. (Cl. 65—113)

This invention relates to the manufacture of glass containers, more particularly containers such as ampoules and injection bottles which are intended to contain medicaments.

The glass industry is making great endeavours to devise an economic method of manufacturing unadulterated containers for medicaments or the like. The medicaments industry complains vigorously that, despite all the technical precautions taken in filling, closing and sterilizing ampoules, injection bottles or the like, filled containers containing foreign bodies are constantly being found. This means that staff must be specially provided to inspect all the finished ampoules or the like and discard those containing foreign bodies. The outlay for this is correspondingly large. Even after obviously unserviceable containers have been discarded, it is impossible to be absolutely sure that all the unadulterated containers have been removed. This is partly because such containers are made from portions of glass tubing which is first drawn from molten glass at a temperature above 1000° C., and which is still at a temperature of about 150–200° C. when it is severed into portions. Mechanical severance leads to very fine glass slivers which penetrate into the interior of the tube-portions. The slivers remain at first near the open end, but as they cool to room temperature they cling to the tube walls. Subsequent washing of the glass tubes in the glassworks before machining to form containers does not remove all the slivers or foreign bodies or other impurities, and with some of the tube-portions, more particularly those used for making ampoules, sterilisation of the filled ampoules at about 150° C. leads to the combined effect of expansion of the glass of the ampoule and of the medicament liquid contained therein causing further small pieces of glass to be detached from the walls. Ampoules in which this has happened are either not detected at all or are detected and removed only at final inspection. The rejects are a complete loss. The pharmaceutical industries concerned state that losses at present run at the rate of about 2–5%. If the rejects contain an expensive medicament costing something like 20 German marks or more per item, such a rejection rate is high enough to constitute a considerable disadvantage and to lead to considerable losses and expenses. Where an inoculation serum is injected directly into the circulatory system, and despite checking accidentally contains foreign bodies, there is a risk to the life of the person inoculated.

Many proposals have been made to reduce these risks but are either not reliable enough or are uneconomic, so that great endeavours and outlays continue.

According to one known proposal, ampoules are formed directly from a vertical tube draught issuing at a glassworks, whereafter the ampoules are hermetically closed at the tips. However, this proposal was unsuccessful for a variety of reasons.

For ampoules to be formed economically, the dimensions, diameter, wall thickness, roundness and straightness of the glass tubes used for their production must comply with fairly close tolerances which cannot be observed, using existing means, at the draught stage. Consequently, the usual practice is for the tubes delivered by the glassworks to be further processed in special processing works where like tubes are first sorted out into groups. The machinery for doing this requires differently trained labour and different sites from those which are normally available in a glassworks, also a vertical tube draught suitable for simultaneous conversion into ampoules would have to be so long—about 80 metres—that the proposal is not feasible.

Other proposals were therefore made to close the ends of tubes severed at glassworks by means of caps but it is impossible to prevent the dust evolved by cutting with mechanical tools from entering the tubes; such dust may spread over the tube in the course of time even though heavy soiling of the tube interior during transport and storage can be prevented. According to another proposal, therefore, mechanical severance is abandoned; instead, the tubes are first plasticised by a cutting flame which moves along with the draught, and are then torn off, so that the end edges of the tube-portions are melted smooth and the tube-portions are free of dust. Such ends are then covered by caps. However, this proposal is relatively expensive in practice.

The principal object of the present invention is therefore to provide methods and apparatus for use in the manufacture of glass containers, which methods and apparatus will enable the above-mentioned difficulties and disadvantages to be overcome or, at least, reduced.

It is a further object of the invention to provide a method of manufacturing glass containers, by means of which the entry of foreign bodies into the containers is obviated during manufacture, despite any human failure which may occur between the time when the liquid glass issues at the glassworks and the time when the finished vessel is completed.

With the method of the invention, the economically and technically necessary separation between the glassworks and the processing works may be maintained. Tube-portions are detached from the draught tube at the glassworks and the processing works at which these tube-portions are used to form containers may be at a different place from the glassworks. Sorting of the tube-portions is very important and is best done at the processing works. The glass tube-portions can be stored for as long as required and there is not the slightest chance of any foreign bodies entering them. Since the tubes can be stored, any required number of them can be made immediately available to the processing works in the case of peak demands, for instance, due to epidemics or the like. As compared with the prior art procedure, the glass-works delivery time disappears, not to mention the time-consuming, often unreliable and very expensive tube cleaning procedure. Also, the processing works are far better able to tackle peak loads than are glassworks which must make their deliveries uniformly over prolonged periods if glass quality is not to vary considerably.

It is not absolutely necessary to completely avoid using mechanical cutting equipment at the glassworks; indeed, it is quite satisfactory from the point of view of economy and reliability for glass tubes to be severed mechanically, provided that the two ends are subsequently severed by means of a cutting flame, as far as the depth of unavoidable dust entry. This distance may be anything up to 2.5 cm. Simultaneously with the severing operation, the cutting flame closes the tube ends thus exposed. The severed end-portions may be destroyed. Should any individual particles of glass have reached the region of the cutting flame, such particles are melted by the heat of the flame.

It has been found that there is an optimum temperature for clean mechanical severance with minimum evolution of dust, and during the mechanical severance of tube-portions from a glassworks draught as part of the method of the invention, one or more burners may be disposed along the tube draught, such burners controlling the temperature at the place of severance, that is to say, adjusting the temperature to the optimum value. This helps to avoid formation of, more particularly, relatively coarse slivers substantially or completely.

In one particularly advantageous manner of carrying the invention into effect, glass tubes of a desired length, 1.50 metres for instance, are severed in a continuous operation from a tube draught issuing from a glassworks drawing machine at the full drawing speed and are supplied parallel with one another, and transversely of the drawing direction, to a conveyor which feeds the severed tubes stepwise into a closing machine in which as many tubes are closed in a single step, by melting at both ends, as can be delivered by the tube-drawing machine during the time taken by one complete closure step, so that there is no idle time. Advantageously, the two disposable ends of a tube-portion are severed seriatim and the first end is so shaped as to be of use, during further processing, to form one base of a glass vessel, while the second end-portion may or may not form cullet. In some cases, however, two usable bases can be prepared and used.

In order to avoid the risk of human errors on the processing side, the tube-portions are not opened until immediately before they enter the processing machine, being supplied thereto automatically after opening, and being further processed in such machine. Depending upon circumstances, it may suffice to open either just the rearward end of the freshly supplied tube or just the forward end thereof by a flame, while in other cases, such as where the two ends of the tube are shaped to form bottle necks for instance, both ends can be opened by a flame.

To obviate breakage during processing, which might lead to the presence of foreign bodies in the finished containers, the glass tube-portions are supplied relatively slowly, by a special novel braking device, so that in contrast to the prior art apparatus, severe jolting of the tubes, with the associated danger of slivers being produced, is obviated.

In order that it may be fully understood the invention will now be described in greater detail with reference to the accompanying drawings in which:

FIGURE 1a shows a part of the length of a glassworks draught tube;

FIGURE 1b to 1e show a number of different tube-portions which can be prepared from the draught-tube of FIGURE 1a;

FIGURE 1f is a view to scale larger than that of FIGURES 1a to 1e showing the end-portion of a tube-portion which has been detached from a draught tube and the end edge of which has been rendered smooth by melting;

FIGURE 2 is a front elevation of an arrangement for closing and severing one end of the tube-portion shown in FIGURE 1b;

FIGURE 3 is a plan view of the arrangement shown in FIGURE 2;

FIGURE 4 is a view similar to that of FIGURE 2 but drawn to a larger scale and shows a later stage in the closing and severing operation;

FIGURE 5 is a view similar to that of FIGURE 4 but showing the severance and closure operation completed at one end of the tube-portion shown therein;

FIGURE 6 is another view of the tube-portion shown in FIGURES 2 to 5, but showing the closure of the other end thereof;

FIGURE 7 is a view similar to that of FIGURE 6, but showing a later stage during the closure of the said other end thereof;

FIGURE 10 is a plan view of the machine shown in FIGURE 9;

FIGURE 11 is a plan view of a part of the machine shown in FIGURES 9 and 10, drawn to a larger scale and showing the station at which fresh tube-portions are supplied;

FIGURE 12 is a view similar to that of FIGURE 10, but shown somewhat diagrammatically and simplified and showing the first part of the feeding movement of a fresh tube-portion;

FIGURE 13 is a view similar to that of FIGURE 12, but showing the second part of the tube-feeding movement and FIGURES 14–16 are simplified diagrammatic views corresponding to the side elevational view of FIGURE 9 and showing various stages during the supply of a fresh tube-portion.

Figure 8:
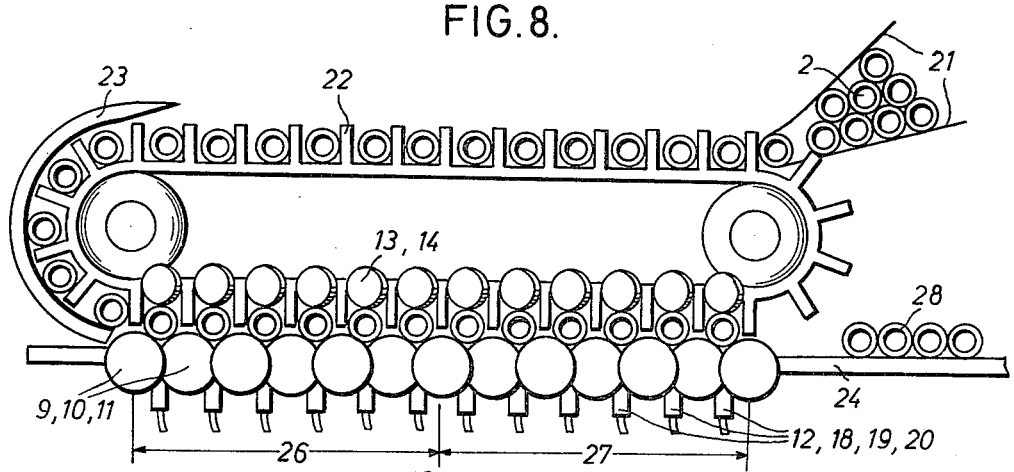
FIGURE 8 is a somewhat diagrammatic side elevational view of a machine for carrying out in a continuous operation the steps illustrated in FIGURES 2 to 7.

Referring now to FIG. 1a, the reference 1 denotes a draught tube which is shown ideally as being straight but which cannot usually be made straight in practice but tends to sag to a depth of 25 mm., over a length of 1.5 metres. It is not simple to treat such tubes by the method the invention and special steps are required which will be described hereinafter in greater detail.

The draught tube 1 is produced continuously at full drawing speed, either in a horizontal or a vertical direction but in the latter case it is deflected into the horizontal direction. As it is formed the draught tube 1 is cut up into appropriate lengths of, for instance 1.5 metres, by means of mechanical cutting apparatus. Thus tube-portions 2 as shown in FIG. 1b are produced, which usually have fairly jagged ends. It is found that the glass dust produced during first penetrates only a little into the tube interior, covering the region indicated at 3, which may in practice extend over a length of up to 2.5 cm. The tube 2 is therefore closed by melting at points spaced inwardly from its ends, in such a way that the parts 3 are removed. The result (FIG. 1c) is a tube-portion 4, both ends 5 of which are closed, as shown diagrammatically in the drawing. The ends 3 can be used subsequently as bases for bottles to be produced from the tube-portion 4. Alternatively, and as shown in FIG. 1d, the draught tube 1 can be used to prepare glass tubes in which only one end opening is closed, while at the other end the glass tube is just melted through and torn off to form a blunt end. In this case, in contrast to what occurs when mechanical cutting apparatus is used, a rounded edge 6 is formed by melting, as shown more clearly in FIG. 1f, the result being a tube of the form 7. Alternatively, both ends can be torn off in this way so as to give a tube-portion of the form 8 shown in FIG. 1e.

The tubes, open at one or both ends, are then closed in special closing machines; conveniently, as many tubes are dealt with simultaneously as correspond to the duration of one closing step, so that the draught tube can tion of one closing sstep, so that the draught tube can issue at a constant maximum speed and all the component tubes can be processed without any idle time.

In the case of tube-portions detached from the draught tube mechanically, the method of closing is illustrated in greater detail in FIGS. 2 to 8. In contrast to conventional glass tube processing machinery, the tubes do not rest between two or four or six pairs of roller numbers (hitherto used), but on three pairs of roller-members 9, 10 and 11, the corresponding roller-members 9 and the corresponding roller members 10 being disposed on opposite sides of a cutting flame 12 adapted to cut off the dust-contaminated end 3 (cf. FIG. 1b). The roller members 11 are disposed at the opposite end of the glass tube 2. The advantage of this triple mounting is that the tube moves smoothly and the severance area is evenly heated even in sagging areas of the tube, since the free sagging part can each gyrate freely. The roller-members 9 can be double rollers as illustrated. At the position at which the roller-members 9 are located, an inclinedly positioned backing roller 13 acts downwards on the tube 2, and another inclinedly positioned backing roller 14 acts downwards on the tube 2 at the position at which the roller-members 11 are located. Due to the inclination of the roller 14, the tube 2 is pressed against a stop 15, while due to its inclined position the roller 13 acts in a direction tending to pull the end 3 off the tube 2.

FIG. 4 illustrates the beginning of the severing step, the tube 2 now having a reduced portion 16 due to the action of the flame.

FIG. 5 illustrates what happens at the completion of severance. The part 3 is removed or drops away as cullet and a closed end 5 is formed. This may later serve as a base for a container made from the tube 2. If the flame and speed of rotation are suitable, this closed end 5 can readily be made planar. However, this cannot readily be done with the second base 5′ at the other end of the tube since, as the glass cools, a negative pressure is produced within the tube and causes the end surface to be drawn inwards as shown in FIG. 6. This may not matter in cases where the end-portion will subsequently become cullet. However, if it is desired to produce a second plane end-surface the method shown in FIG. 7 is used. While the end face is being formed, a base mark 17 is pressed on and, by means of extra burners 18 and 19, the air inside the now completely closed tube is heated so as to produce inside the tube a positive pressure which presses the base 5′ against the base mark 17. Since the tube 2 is rotated continuously, a uniformly plane base surface 5′ is formed, a flame 20 ensuring that the base is sufficiently plasticised and made shapable in the uncovered area. The flame 20 also also helps to relieve the first base 5 of stress. The gas flame 20 is then shut off, the excess internal air pressure being maintained by the burners 18 and 19 until the base has set. The base mark 17 can take the form of a bar or rail, common to a number of tubes.

The method described with reference to FIGS. 2 to 7 may be carried out as a continuous process by the use of the closing machine shown in FIG. 8. Portions 2 severed from a draught tube are supplied transversely of the drawing direction to a magazine 21, by means not shown. The tube-portions 2 are removed from the magazine 21 by a gripper chain 22, in the manner shown in FIG. 8, and conveyed onwards in the direction indicated by arrows. Batches of, for instance, ten to twenty tube-portions are collected and removed at a time stepwise. The tube-portions pass around a guide track 23 on to the bottom of the gripper chain and at first rest on a slide bar 24, until the required number of tubes are disposed above the gusset-shaped gaps between the overlapping rollers 9, 10 and 11. For production engineering reasons the respective ends of the tube-portions are closed in two separate operations, one end of each tube being closed during movement along the conveyor portion 26 and the other end being closed during movement along the conveyor portion 27. When the tubes are above the appropriate work stations, the bar 24 is lowered automatically so that the tubes then rest on the bottom rollers 9, 10 and 11 and are rotated around themselves by the bottom rollers 9, 10 and 11 and/or by the top rollers 13 and 14. The tube ends are guided in the correct direction by control means (not shown) and by stop bars also not shown but corresponding to the bars 15 and 15′ of FIGS. 2 to 7, which are arranged at each end. The result is closed tubes 28 which have a plane base at both ends and which, when the bar 24 is raised once again, are removed to the exterior to another magazine.

The closed tubes can be stored for as long as desired and can readily be handled during transportation, since they have smooth ends closed by melting, in contrast to the mechanically severed tubes of the prior art which, with their sharp edges, were a menace to packing and to the clothing of staff. Before further processing, the closed tubes are given appropriate sorting treatment in accordance with diameter, wall thickness, roundness, straightness and so on; since the ends are closed, optical methods may be used for sorting the tubes.

Another advantage of the closing machine is that it can be used for other purposes in addition to severing the unserviceable ends and closing the tube-portions. For instance, the closing machine can be used to straighten bent tubes, to close torn-off tubes having melted ends at one or both ends without the severance of unserviceable parts, and so on.

Figure 9:
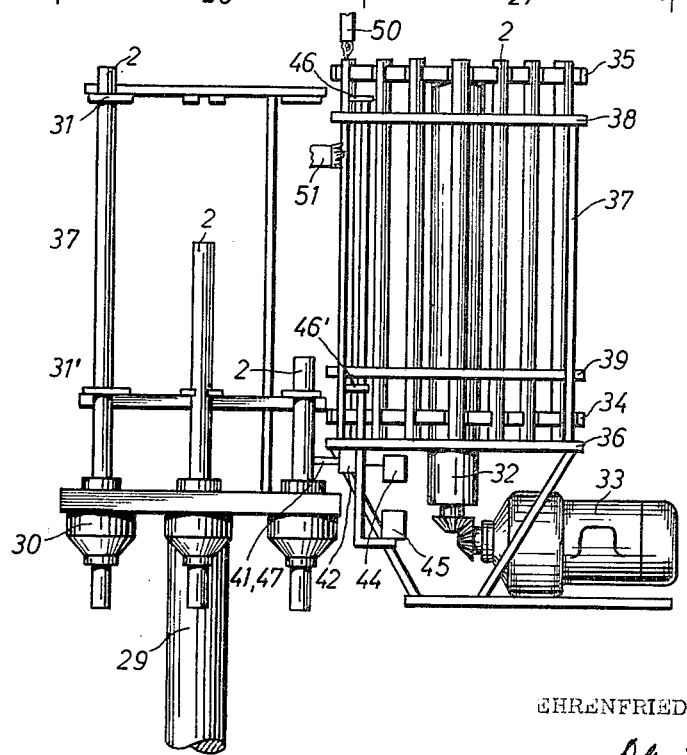
FIGURE 9 is a side elevational view of a processing machine to which closed tubes are supplied automatically.

FIGS. 9 to 16 show how the closed tubes are automatically supplied to a processing machine. Referring to FIG. 9, the reference 29 denotes a vertical rotatable central pillar of a processing machine in which the glass tubes are retained in sockets or linings 30 and are advanced or admitted downwards at the beginning of a new work step. The tubes 2 actually being treated are engaged loosely around the top by grippers 31, 31′ (FIGS. 9 and 11) which open resiliently when a tube is introduced, until the tubes 2 are received by the lining 30 and can therefore be supported by the lining 30 alone. To enable operation to be continuous, a supply receptacle is provided comprising a rotatable central pillar 32 driven intermittently by a motor 33 associated with appropriate control means or switch 44. The pillar 32 has a toothed disc 35 at the top and a toothed disc 34 at the bottom, and is surrounded by a stationary cage which comprises a bottom plate 36 serving as slideway for the supply tubes 2′, vertical bars 37 and guiding or retaining rings 38 and 39. The supply tubes 2′ can be introduced into apertures 40 of the intermittently rotating gripper discs 34, 35 either by an operator or automatically from a magazine (not shown) until the discs 34, 35 are completely full.

A sensing arm 41 rotataby mounted at 42 is provided for automatic replacement of a used tube 2 in the machine 1. The arm 41 is bent, as can be seen in FIGS. 10 and 11, and is pushed aside anti-clockwise by the tubes 2 of the processing machine (chain-like position of FIGS. 10 and 11) for as long as there are still tubes 2 of sufficient length in the processing machine. Immediately a tube 2 passing by the arm 41 is not long enough to reach the same and therefore to be of use for making a serviceable container the arm 41 pivots into the solid-line position shown in FIGS. 10 and 11, and its outer end extends over the adjacent station 43 of the processing machine. This pivoting movement acts by way of the switch 44 to operate a drawing magnet 45 which operates gripper arms 46, 46′, the same picking up the tube 2′ in the supply receptacle which is just standing ready and pushing such tube on to the slideway of the arm 41 until the tube has engaged in the resilient claws 31, 31′, whereafter as the processing machine continues to rotate, the tube slides on the outer bent part 47 of the arm 41, passing over the tube which the feeler previously found to be too short. Since the part 47 is articulated at 48 and is acted upon by a spring 49, the tube is lowered gently and without damage, in contrast to known apparatus wherein the tube drops from some distance and often splinters at the end. The standby tube 2′ is opened at the top end simultaneously or shortly before-hand by an auxiliary flame 50 (FIG. 9); the air in the tube can be so heated by an auxiliary flame 51 that there is no suction when the tube is opened, and therefore no foreign bodies can enter the tube. A resiliently movable feed lever 52 on the gripper arms 46, 46′ ensures that the replacement tube 2′, once it has been introduced into the claws 31, can continue to be freely moved by the processing machine, the lever 52 being pressed aside.

The lining 30 opens automatically when the lever 41 pivots in shortly before the replacement tube is supplied, so that the unusable remainder of the tube 2 can be removed; consequently, the processing machine, in contrast to known automatic feeds, does not cause any loss of time when a used tube 2 is replaced by a replacement tube 2′.

Thanks to this method of supplying and opening the closed supply tubes, the entry of foreign bodies into the tube while the same is travelling from the glassworks to the processing works is completely obviated. Moreover, the processing machine does not have to perform any idle revolutions, so that a very high degree of reliability and economy is achieved.

If required, the bottom of the prepared tube can be opened by a flame either in the release position or shortly beforehand, in which case appropriate means must be provided to support the tube in a floating position while it is being opened.

The closed ampoules delivered by the processing machines must be reopened for filling, and to prevent any entry of glass dust during such openings the tip of the ampoule must not be sawn through with anything in the nature of a steel disc; instead, the tip of the ampoule should be lightly scored and the scored part then freed of glass dust either by means of a brush or by compressed air or by using both a brush and compressed air. Thereafter the scored area, conveniently while the tube remains stationary, is burst open by a fine-pointed flame, a dust-free fracture thus being produced. To obviate negative pressure in the ampoule, the same can be warmed a little by an auxiliary flame before being burst open.

As a precaution, the dust-free packed ampoules are washed at the pharmaceutical works as in machines known per se, at least in the case of wide-tip amopules, that is to say, ampoules having a tip aperture greater than 3 mm. in diameter. Finally the ampoules are filled and sterilized. As a precaution a final inspection of the filled ampoules may be carried out, as has been done hitherto, but it will be found that there are substantially no ampoules containing foreign bodies which originated during the production and processing of the glass.

If there are intervals of time in the pharmaceutical works between washing, filling and closing the ampoules, it is advisable to fill the same in moisture-saturated chambers. To this end, the floor is laid out with tiles and continuously kept wet with water. Dust cannot then be eddied by draughts of air nor by people's clothing, and even the smallest suspended particles stick to the ground.

We claim:
1. A method for manufacturing interiorly clean glass containers comprising the steps of continuously forming a glass tube, detaching successive lengths of the tube as it is formed, closing both ends of each said length by locally flame cutting and sealing said ends to thereby form an interiorly clean closed tube, transporting said clean tubes to a container making plant, opening at least one end of said tubes, and forming containers therefrom.

2. A method for forming a glass tube having closed planar ends comprising the steps of rotating the tube at a preselected speed, flame cutting and sealing one end of the tube to form a planar surface while rotating it at said preselected speed, then flame cutting and sealing the opposite end of the tube while rotating it at said preselected speed, and heating the tube and said opposite end to soften said end and to expand the air trapped in the tube by the sealing operations to force said end against a planar surface by the pressure of the expanded air.

References Cited by the Examiner
UNITED STATES PATENTS

| | | | |
|---|---|---|---|
| 1,862,821 | 6/32 | Henderson | 49—7 |
| 1,888,635 | 11/32 | Koenig | 65—105 |
| 2,009,793 | 7/35 | Sanchez-Vello | 65—187 X |
| 2,103,585 | 12/37 | Kimble et al. | 49—7 |
| 2,166,871 | 7/39 | Luertzing | 65—187 X |
| 2,226,303 | 12/40 | Dichter | 49—7 X |
| 2,392,104 | 1/46 | Smith | 65—120 X |
| 2,523,006 | 9/50 | Gaskill et al. | 65—244 X |
| 2,591,304 | 4/52 | Schuller | 65—176 |
| 2,699,630 | 1/55 | Alm et al. | 49—7 |
| 2,878,620 | 3/59 | Calehuff et al. | 49—1 |
| 3,066,506 | 12/62 | Dichter | 65—243 |
| 3,150,953 | 9/64 | Modelle | 65—113 X |

FOREIGN PATENTS 305,185  11/29  Great Britain.

DONALL H. SYLVESTER, *Primary Examiner.*

IVAN R. LADY, WILLIAM B. KNIGHT, *Examiners.*